T. J. DAVIS & J. HEMINGWAY, Jr.
Potato Planters and Cultivators.

No. 153,546. Patented July 28, 1874.

WITNESSES.
F. B. Townsend
E. T. Kaiser

INVENTOR.
Thos. J. Davis
Jacob Hemingway, Jr.
per
F. A. Lehmann, Atty.

THE GRAPHIC CO. PHOTO-LITH. 39 & 41 PARK PLACE, N.Y.

UNITED STATES PATENT OFFICE.

THOMAS J. DAVIS AND JACOB HEMINGWAY, JR., OF FAIR HAVEN, NEW YORK; SAID DAVIS ASSIGNOR TO SAID HEMINGWAY.

IMPROVEMENT IN POTATO PLANTERS AND CULTIVATORS.

Specification forming part of Letters Patent No. 153,546, dated July 28, 1874; application filed June 16, 1874.

*To all whom it may concern:*

Be it known that we, THOMAS J. DAVIS and JACOB HEMINGWAY, Jr., of Fair Haven, in the county of Cayuga and State of New York, have invented certain new and useful Improvements in Potato Planters and Cultivators; and we do hereby declare the following to be a full, clear, and exact description of the invention, such as will enable others skilled in the art to which it pertains to make and use it, reference being had to the accompanying drawings, which form part of this specification.

The nature of our invention relates to an improvement in potato planters and cultivators; and it consists in the arrangement and combination of devices, which will be more fully described hereafter, whereby the potatoes are sliced or cut, planted, and can afterward be cultivated from time to time, as circumstances may require.

Figure 1:
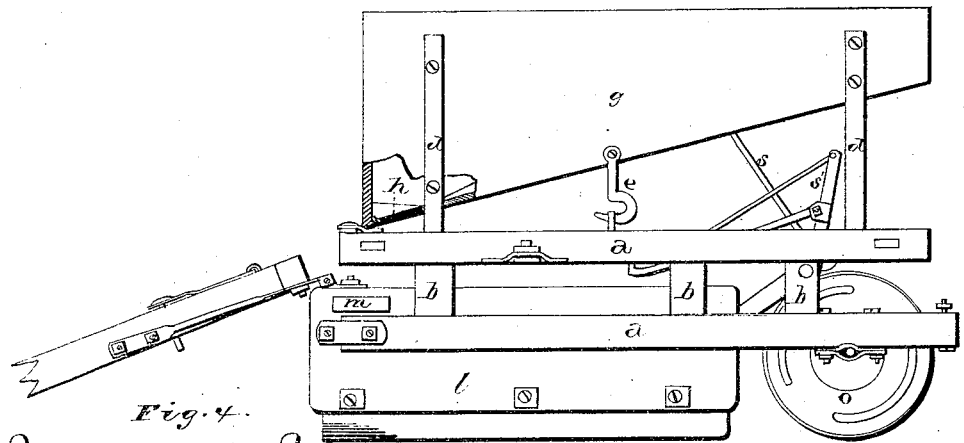
Figure 4:
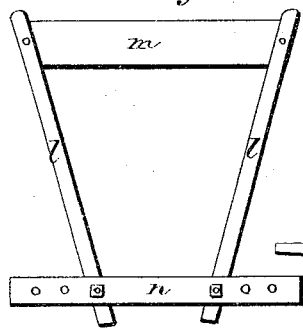
Figure 2:
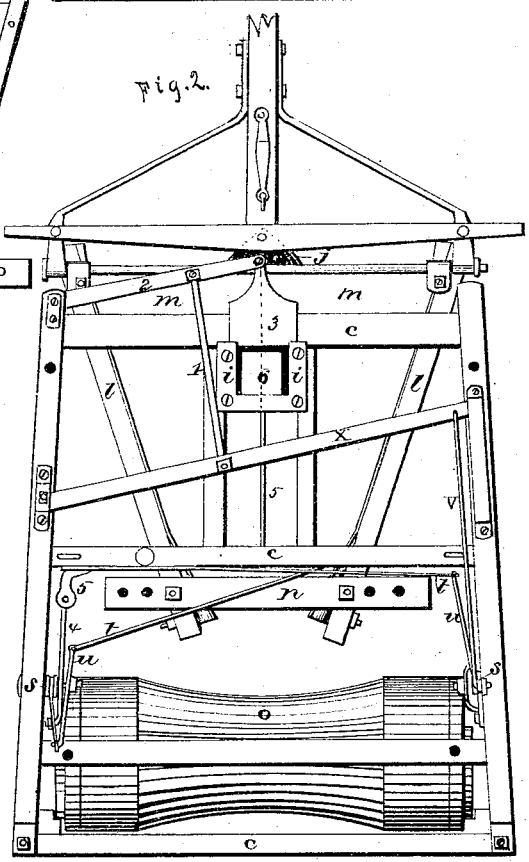
Figure 3:
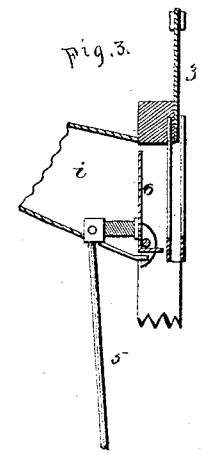

Figure 1 is a side elevation of our invention, complete. Fig. 2 is a plan view of the same when used for cultivating the potatoes alone, and Fig. 3 a detail view. Fig. 4 is a plan view of the covering device.

The frame of our machine is somewhat wider at the rear than the front end, and is composed of the longitudinal bars $a$, placed one above the other, and secured together by the standards $b$. These bars on each side are connected by means of the cross-braces $c$, in such a manner as to brace them securely together; but the construction of this frame can be varied indefinitely, as may be desired. Placed upon the top of this frame, and secured in position by means of dowels or tenons on the ends of the standards $d$, and by the hooks $e$, is the bed $g$, having an inclined bottom, so that the potatoes will all roll down to its front end, to the hole $h$. Secured to the under side of the frame, just under this hole, is the conductor $i$, which conveys the cut potatoes down into the furrow opened by the shovel $j$. Fastened between the front ends of the bars $a$, by means of any suitable devices, are the coverers $l$, which are pivoted to the cross-bar $m$ at their front ends, and connected together at their rear ends by the cross-bar $n$, having a series of holes, so that the two parts can be moved nearer together or farther apart, as may be desired. When they are used as coverers only, they are moved near together, so that they will throw just the requisite amount of dirt upon the potatoes; but after the potatoes have grown, by moving the coverers outward to a suitable distance, they will not only serve to thoroughly weed them, but will heap the dirt up against them from each side. By thus making these coverers adjustable, and securing them to the frame, as shown, we are able to combine two machines in one, and thus dispense with a cultivator. These coverers may be made of wood and have a metal plate secured to their lower edges, which plate will have its front and rear corners suitably bent, so as to throw the dirt in the proper direction. If so desired, a cultivator-tooth may be attached to the front end of each coverer, so as to open the ground and give the coverers a better opportunity of loosening the surface. Journaled on the rear end of the frame is the roller $o$, made concave along its surface, so as to pass over the top of the row formed by the coverers. Upon each end of this roller are secured two or more flanges, which form segments of a circle. As the roller revolves, these flanges strike against the lower ends of the pivoted levers $s\ s'$, which are alternately forced backward and then returned to position by the springs $t$, through the connecting-rods $u$. To the upper end of the lever $s$ is secured a rod or lever, $v$, which has its other end attached to the lever $x$, which extends across the frame. Near the center of the lever $x$ is fastened a connecting-rod, 1, which joins it to the lever 2, for operating the knife 3, which knife cuts the potatoes into parts as they fall into the hole $h$. Fastened to the lever $s'$ is a lever, 4, which has its other end attached to a lever, 5, placed at right angles to it, under one of the cross-bars of the frame, which lever 5 is attached to the valve 6, placed in the conducting-tube $i$.

As the two levers $s\ s'$, which operate the knife and valve, are worked alternately, the valve remains closed until the knife has made its cut, and then the valve drops down to discharge the cut potatoes, while the knife performs the part of a valve to prevent the potatoes from dropping through from the bed. As soon as the valve rises to its position again, the knife moves back for another cut.

If so desired, one or more wheels may be attached to the front of the frame, so that the depth of the furrow can be regulated at will, and the machine more easily managed in turning around.

In cultivating the potatoes after they have grown, the roller $o$ is entirely removed from the frame, and after the potatoes have reached their full growth, the frame is removed and the coverer used alone.

Having thus described our invention, we claim—

1. In a potato-planter, the adjustable covering device $l\ m\ n$, made detachable from the frame $a$, and provided with a draft device, whereby it can be used to cover the potatoes while being planted, and to cultivate them afterward, substantially as set forth.

2. The combination of the roller $o$, having the cams secured to each end, with the levers $s\ s'$, connecting-rods $u$, spring $t$, rods $v\ 1\ 4$, levers $x\ 2\ 5$, valve 6, and knife 3, substantially as shown and described.

In testimony that we claim the foregoing, we have hereunto set our hands and seals this 10th day of June, 1874.

T. J. DAVIS. [L. S.]
JACOB HEMINGWAY, JR. [L. S.]

Witnesses:
ROBERT HUME,
GARRETT VAN FLEET.